United States Patent
Wu et al.

(10) Patent No.: US 10,046,697 B2
(45) Date of Patent: Aug. 14, 2018

(54) ROAD TRAFFIC WARNING DEVICE AND COMMUNICATOR AND METHOD THEREOF

(71) Applicant: CLOUD NETWORK TECHNOLOGY SINGAPORE PTE. LTD., Singapore (SG)

(72) Inventors: Yu-Chien Wu, New Taipei (TW); Hung-Chun Lu, New Taipei (TW); Chuang-Wei Tseng, New Taipei (TW); Tzu-Cheng Yang, New Taipei (TW)

(73) Assignee: Cloud Network Technology Singapore Pte. Ltd., Singapore (SG)

( * ) Notice: Subject to any disclaimer, the term of this patent is extended or adjusted under 35 U.S.C. 154(b) by 96 days.

(21) Appl. No.: 15/200,161

(22) Filed: Jul. 1, 2016

(65) Prior Publication Data
US 2017/0313241 A1   Nov. 2, 2017

(30) Foreign Application Priority Data
Apr. 28, 2016   (TW) .............................. 105113261 A

(51) Int. Cl.
| | | |
|---|---|---|
| *H04N 9/47* | (2006.01) | |
| *H04N 7/18* | (2006.01) | |
| *B60Q 1/52* | (2006.01) | |
| *B60Q 7/00* | (2006.01) | |
| *B60R 1/00* | (2006.01) | |
| *G08G 1/16* | (2006.01) | |

(52) U.S. Cl.
CPC ................. *B60Q 1/52* (2013.01); *B60Q 7/00* (2013.01); *B60R 1/00* (2013.01); *G08G 1/162* (2013.01)

(58) Field of Classification Search
None
See application file for complete search history.

(56) References Cited

U.S. PATENT DOCUMENTS

2015/0120336 A1\*   4/2015   Grokop ................. B60W 40/09
                                                                    705/4

\* cited by examiner

*Primary Examiner* — Chikaodili E Anyikire
(74) *Attorney, Agent, or Firm* — ScienBiziP, P.C.

(57) ABSTRACT

A mobile warning device on a vehicle includes a detecting module, a driving module, a monitoring module, and a communication module. The detecting module determines whether the vehicle is unexpectedly immobile. The driving module is detachably set on the vehicle to detach and move the warning device to a specified position when the vehicle is immobile. The monitoring module is used to collect information around the vehicle. The communication module is used to transmit signals between the vehicle, the warning device, and a cloud network.

17 Claims, 4 Drawing Sheets

ROAD TRAFFIC WARNING DEVICE AND COMMUNICATOR AND METHOD THEREOF

FIELD

The subject matter herein generally relates to road traffic warning devices.

BACKGROUND

Cars have become the most important means of transport in people's lives. More and more people buy cars, but the number of road accidents is also on the rise, rear-end collisions accounting for a relatively large proportion of accidents.

BRIEF DESCRIPTION OF THE DRAWINGS

Implementations of the present technology will now be described, by way of example only, with reference to the attached figures.

DETAILED DESCRIPTION

Figure 1:
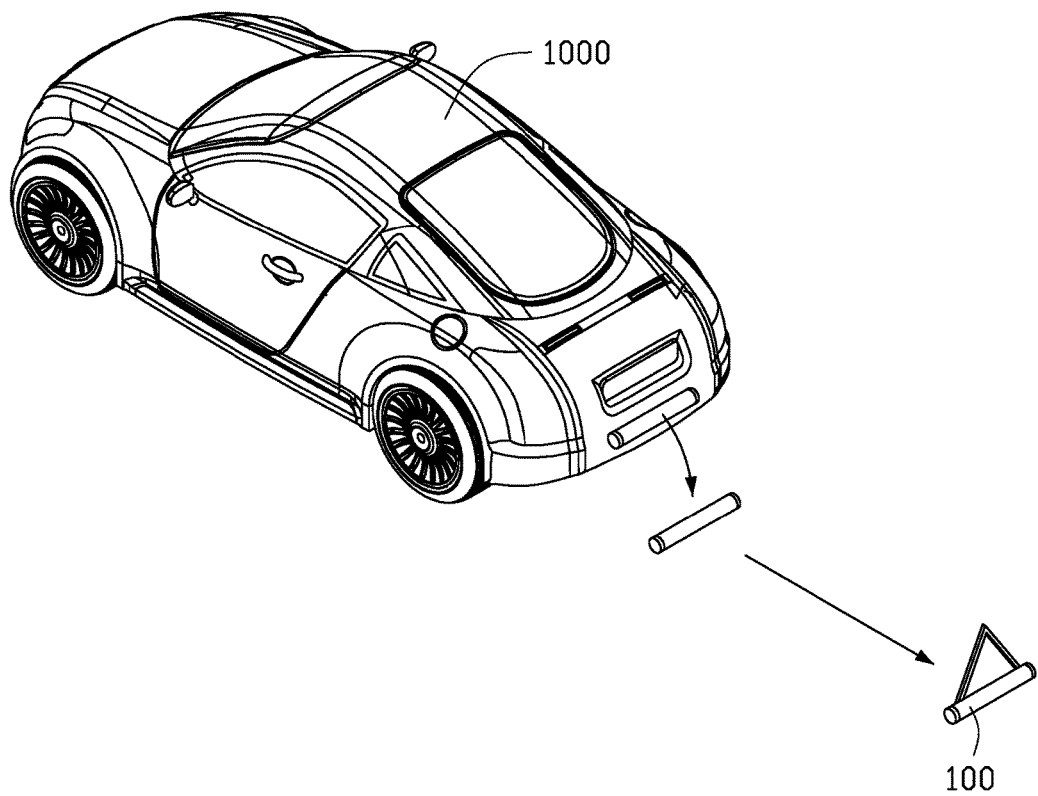
FIG. 1 is a schematic diagram of an embodiment of a vehicle warning device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series and the like. The term "normally" as in "working normally" means "without problems." The term "cloud" means "servers or other computing device coupled to the internet."

The disclosure is described in relation to a warning device applied to a vehicle.

FIG. 1 illustrates an embodiment of a warning device 100. The warning device 100 can comprise a detecting module 10, a driving module 11, a communication module 12, and a monitoring module 13. The warning device 100 is applied to a vehicle 1000.

The detecting module 10 can comprise at least one sensor to detect whether the vehicle 1000 is in an accident or is immobile after a sudden stop.

The driving module 11 is detachably set on the vehicle 1000. The driving module 11 is configured to drive the warning device 100 to a specified position.

The communication module 12 is configured to transmit data between the warning device 100 and the cloud.

The monitoring module 13 can comprise at least one camera. The monitoring module 13 is configured to collect information around the vehicle 1000.

In at least one embodiment, the detecting module 10 can comprise a gravity sensor 101. The gravity sensor 101 is configured to sense an acceleration of the vehicle 1000 and a facing direction of the vehicle 1000. The detecting module can comprise a gyroscope sensor 102 to adjust a direction of the warning device 100.

The communication module 12 can comprise a positioning unit 121 to obtain a location of the warning device 100. The communication module 12 is configured to send the location of the warning device 100 to the cloud.

In one embodiment, the positioning unit 121 is a global positioning system device.

In one embodiment, the communication module 12 can be coupled to the vehicle 1000. The communication module 12 can output signals from the vehicle 1000, and to and from the warning device 100.

In one embodiment, the communication module 12 can comprise a wireless transceiver 122 which can support a first communication protocol. The first communication protocol can comprise a wireless local area network protocol, a BLUETOOTH communication protocol, and a fourth generation mobile communication protocol.

When the vehicle 1000 is operating normally, the monitoring module 13 captures photographs around the vehicle 1000 and generates a video. The monitoring module 13 outputs the video through the communication module 12.

When the detecting module determines that the vehicle 1000 is immobile as a result of an accident or other untoward event (e.g. unexpectedly immobile), the driving module 11 controls the warning device 100 to drop from the vehicle 1000 and control the movement of the warning device 100 to a specified position. The monitoring module 13 shoots videos continuously during this process. The driving module 11 drives the warning device 100 according to a preset program. A position in the preset program can be a first preset distance away from the vehicle 1000 in an opposite direction of the vehicle 1000, and the position is behind the vehicle 1000. The driving module 11 adjusts a direction of the warning device 100 through the gyroscope sensor 102 to warn vehicles approaching from behind the vehicle 1000. The first preset distance can be a value between thirty meters and a hundred meters in this embodiment.

In one embodiment, the warning device 100 can be a triangle of reflective material. The warning device 100 is coupled to a trunk of the vehicle 1000 through a buckle. When the detecting module 10 determines that the vehicle 1000 is unexpectedly immobile, the detecting module 10 detects a direction and orientation of the vehicle 1000 to determine whether the vehicle 1000 is still upright. When the vehicle 1000 is overturned and the warning device 100 cannot move away from the vehicle, the warning device 100 transmits signals to the cloud continuously.

In one embodiment, a plurality of warning devices 100 can be set in other positions on the vehicle 1000 to ensure that at least one warning device 100 can move away from the vehicle 1000 even if the vehicle 1000 is overturned.

The cloud receives signals from the warning device 100 and transmits the signals to rescuers. The warning device 100 can also transmit signals to a mobile phone of a user. The mobile phone of the user can forward the signals to the cloud.

In one embodiment, the warning device 100 can be controlled by the mobile phone of the user.

In one embodiment, the warning device 100 can comprise an alerting unit. The alerting unit can issue sound and light.

The warning device 100 comprises a power module to supply power for the warning device 100.

Figure 2:
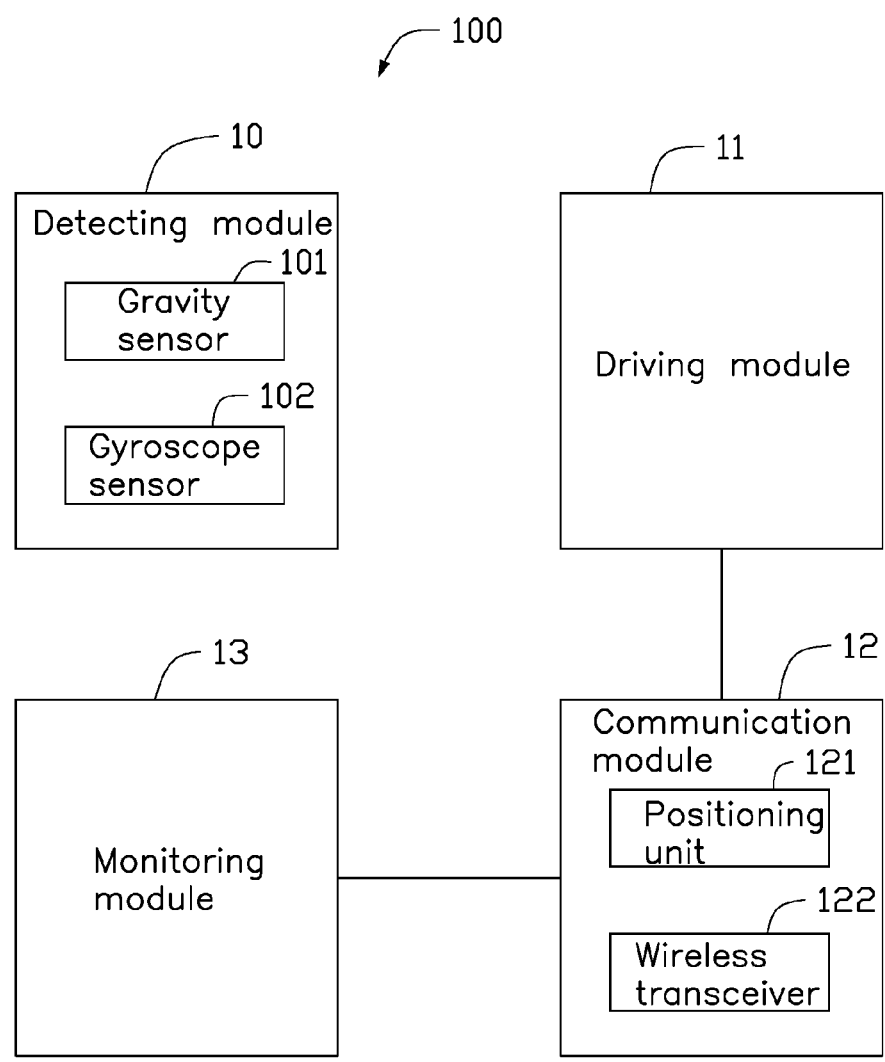
FIG. 2 is a block diagram of an embodiment of the warning device of the present disclosure.
Figure 3:
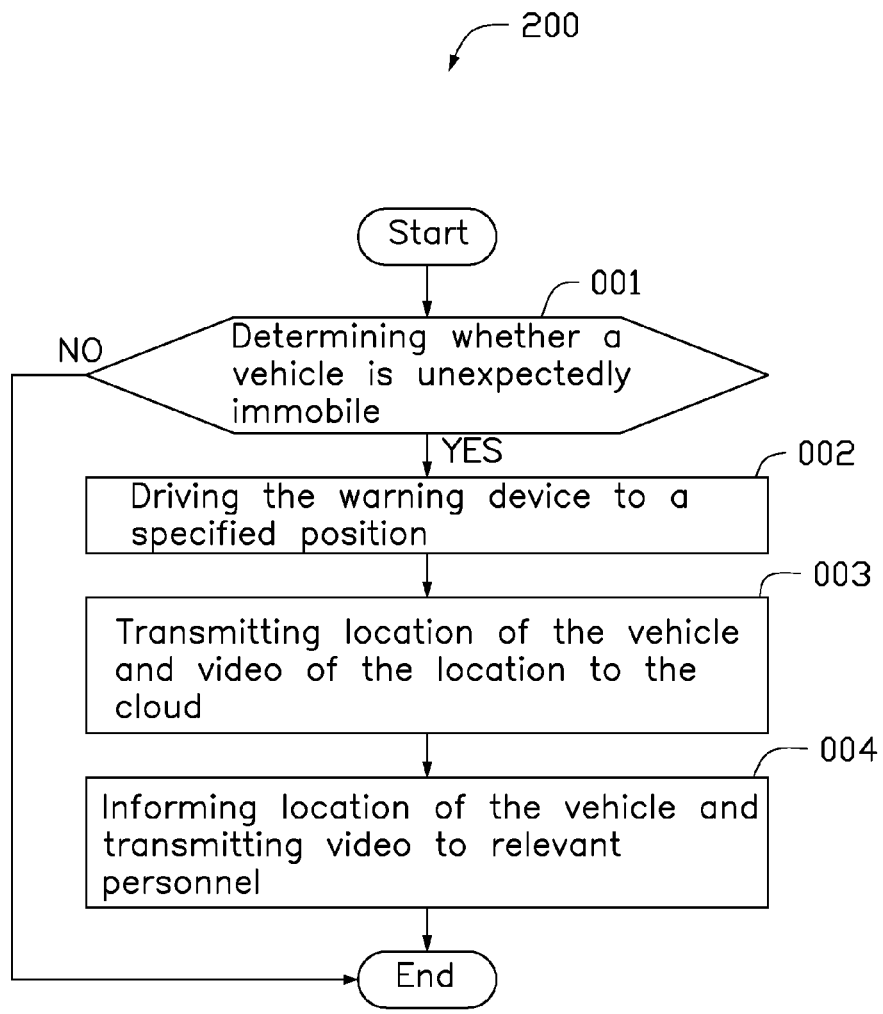
FIG. 3 is a flow chart of an embodiment of a warning method of the present disclosure.
Figure 4:
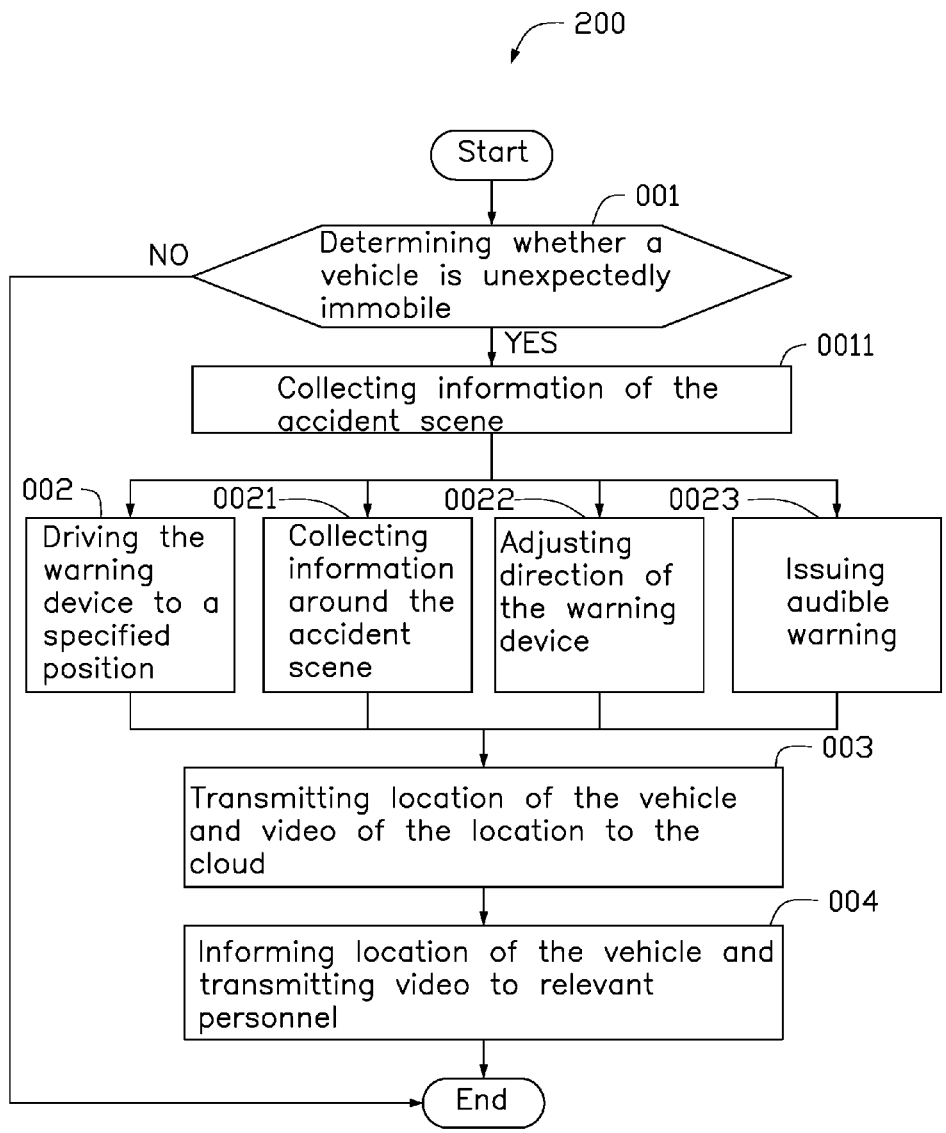
FIG. 4 is a flow chart of an embodiment of the warning method of the present disclosure.

FIG. 3 and FIG. 4 illustrate flowcharts of a warning method. The example method is provided by way of example, as there are a variety of ways to carry out the method. The method described below can be carried out using the configurations illustrated in FIG. 1 and FIG. 2, for example, and various elements of these figures are referenced in explaining the example method. Each block shown in FIG. 3 and FIG. 4 represents one or more processes, methods, or subroutines carried out in the example method. Furthermore, the illustrated order of blocks is by example only, and the order of the blocks can be changed. Additional blocks can be added or fewer blocks can be utilized without departing from this disclosure. The example method can begin at block 001.

At block 001, determining whether a vehicle is unexpectedly immobile;

At block 002, driving the warning device to a specified position;

At block 003, transmitting location of the vehicle and video of the location to the cloud;

At block 004, informing location of the vehicle and transmitting video to relevant personnel.

The example method can further comprise:

Block 0011, collecting information of the accident scene;

Block 0021, collecting information around the accident scene;

Block 0022, adjusting direction of the warning device;

Block 0023, issuing audible warning.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

It is also to be understood that the above description and the claims drawn to a method may include some indication in reference to certain steps. However, the indication used is only to be viewed for identification purposes and not as a suggestion as to an order for the steps.

What is claimed is:

1. A warning device applied to a vehicle, comprising:
a detecting module comprising at least one sensor configured to determine whether the vehicle is unexpectedly immobile and determine whether the vehicle is upright when the vehicle is unexpectedly immobile;
a driving module detachably set on the vehicle and configured to control the warning device to drop from the vehicle and to move to a specified position when the vehicle is unexpectedly immobile and is upright;
a monitoring module configured to collect information around the vehicle; and
a communication module configured to transmit the information between the warning device and a cloud network when the vehicle is overturned.

2. The warning device as claim 1, wherein the detecting module comprises a gravity sensor.

3. The warning device as claim 1, wherein the detecting module comprises a gyroscope sensor.

4. The warning device as claim 1, wherein the communication module comprises a positioning unit configured to get a location of the warning device, the monitoring module captures photographs of the scene around the vehicle and generates a video, the information comprise the location of the warning device and the video.

5. The warning device as claim 1, wherein the communication module comprises a wireless transceiver configured to transmit the information between the warning device and the cloud network.

6. The warning device as claim 1, wherein the warning device is a triangle of reflective material, the driving module comprises a preset program configured to control the warning device to move a preset distance when the detecting module determines the vehicle is in an accident.

7. A warning system, comprising:
a vehicle; and
a warning device comprising:
a detecting module comprising at least one sensor configured to determine whether the vehicle is unexpectedly immobile and determine whether the vehicle is upright when the vehicle is unexpectedly immobile;
a driving module detachably set on the vehicle and configured to control the warning device to drop from the vehicle and to move the warning device out of the vehicle when the vehicle is unexpectedly immobile and remains upright;
a monitoring module configured to collect information around the vehicle; and a communication module configured to transmit the information between the warning device and a cloud network.

8. The warning system as claim 7, wherein the detecting module comprises a gravity sensor.

9. The warning system as claim 7, wherein the detecting module comprises a gyroscope sensor.

10. The warning system as claim 7, wherein the communication module comprises a positioning unit configured to get a location of the warning device, the monitoring module captures photographs of the scene around the vehicle and generates a video, the information comprise the location of the warning device and the video.

11. The warning system as claim 7, wherein the communication module comprises a wireless transceiver configured to transmit the information between the warning device and the cloud network.

12. The warning system as claim 7, wherein the warning device is a triangle of reflective material, the driving module comprises a preset program configured to control the warning device to move a preset distance when the detecting module determines the vehicle is in an accident.

13. The warning system as claim 7, further comprising a mobile phone, the communication module is further configured to transmit signals to the mobile phone, and the mobile phone is configured to forward the signals to the cloud network.

14. A warning method for a warning device, comprising:
determining whether an accident happens on a vehicle;
determining whether the vehicle remains upright when the accident happens to the vehicle;
driving the warning device to drop from the vehicle and to move to a specified position when the vehicle remains upright;
transmitting a location of the accident and video of the location, where the accident happened, to a cloud network when the vehicle is overturned; and informing the location and video of the location to relevant personnel via the cloud network.

15. The warning method as claim 14, further comprising: collecting information of an accident scene in the location.

16. The warning method as claim 14, further comprising: adjusting direction of the warning device.

17. The warning method as claim 14, further comprising: warning through sound.

* * * * *